United States Patent [19]
Nakamura

[11] Patent Number: 6,044,425
[45] Date of Patent: *Mar. 28, 2000

[54] INFORMATION PROCESSING SYSTEM FOR SELECTIVELY CONNECTING MULTIPLE TYPES OF EXTENSION DEVICES TO CONNECTION PORTS

[75] Inventor: Akihiko Nakamura, Yamanashi, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/651,745

[22] Filed: May 22, 1996

[30] Foreign Application Priority Data

May 23, 1995 [JP] Japan ................................. 7-123510

[51] Int. Cl.$^7$ ...................................................... G06F 13/00
[52] U.S. Cl. ............................................... 710/104; 710/2
[58] Field of Search ...................................... 395/828, 282, 395/189, 204; 364/186; 710/2–4, 8–10, 15–19, 62–64, 72–74, 101–104

[56] References Cited

U.S. PATENT DOCUMENTS

| | | | |
|---|---|---|---|
| 4,121,284 | 10/1978 | Hyatt ............................ | 364/200 |
| 4,268,902 | 5/1981 | Berglund et al. ............... | 364/200 |
| 4,589,063 | 5/1986 | Shah et al. ..................... | 395/828 |
| 4,703,446 | 10/1987 | Momose ......................... | 364/580 |
| 4,937,762 | 6/1990 | Todome ........................ | 345/439 |
| 5,056,001 | 10/1991 | Sexton .......................... | 364/200 |
| 5,125,081 | 6/1992 | Chiba ........................... | 395/284 |
| 5,191,323 | 3/1993 | Abbes et al. ................... | 340/825.37 |
| 5,220,499 | 6/1993 | Kawamori ..................... | 364/188 |
| 5,274,767 | 12/1993 | Maskovyak ................... | 395/836 |
| 5,353,399 | 10/1994 | Kuwamoto et al. ........... | 395/159 |
| 5,390,129 | 2/1995 | Rhodes ......................... | 702/118 |
| 5,428,752 | 6/1995 | Goren et al. .................. | 395/281 |
| 5,469,554 | 11/1995 | Tucker et al. ................. | 711/210 |
| 5,530,882 | 6/1996 | Sasaki et al. .................. | 395/282 |
| 5,568,525 | 10/1996 | De Nijx et al. ................ | 375/356 |
| 5,568,651 | 10/1996 | Medina et al. ................ | 381/120 |
| 5,611,045 | 3/1997 | Basile ............................ | 395/184.01 |
| 5,617,430 | 4/1997 | Angelotti et al. ............. | 371/27 |
| 5,628,027 | 5/1997 | Belmont ........................ | 395/821 |
| 5,644,470 | 7/1997 | Benedict et al. .............. | 361/686 |
| 5,826,103 | 10/1998 | Whittaker ..................... | 395/828 |

FOREIGN PATENT DOCUMENTS

| | | |
|---|---|---|
| 0351961 | 1/1990 | European Pat. Off. . |
| 0443876 | 8/1991 | European Pat. Off. . |
| 0663638 | 7/1995 | European Pat. Off. . |
| WO9006559 | 6/1990 | WIPO . |

*Primary Examiner*—Christopher B. Shin
*Attorney, Agent, or Firm*—Sughrue, Mion, Zinn, Macpeak & Seas, PLLC

[57] ABSTRACT

An information processing system comprises a system controller which has connection ports for connecting expansion devices and performs various arithmetic computations and general control of the information processing system, the expansion devices connected to the system controller through the connection ports, and control unit which determine types of the expansion devices connected to the information processing system and control the operation of the expansion device according to the type of the expansion device.

11 Claims, 4 Drawing Sheets

FIG. 3

| | FIRST PORT CONNECTION DEVICE | SECOND PORT CONNECTION DEVICE |
|---|---|---|
| CASE 1 | TERMINAL EQUIPMENT 21 | TERMINAL EQUIPMENT 31 |
| CASE 2 | TERMINAL EQUIPMENT 21 | TERMINAL EQUIPMENT 32 |
| CASE 3 | TERMINAL EQUIPMENT 22 | TERMINAL EQUIPMENT 31 |
| CASE 4 | TERMINAL EQUIPMENT 22 | TERMINAL EQUIPMENT 32 |
| CASE 5 | TERMINAL EQUIPMENT 21 | NOT APPLICABLE |
| CASE 6 | TERMINAL EQUIPMENT 22 | NOT APPLICABLE |
| CASE 7 | NOT APPLICABLE | TERMINAL EQUIPMENT 31 |
| CASE 8 | NOT APPLICABLE | TERMINAL EQUIPMENT 32 |

INFORMATION PROCESSING SYSTEM FOR SELECTIVELY CONNECTING MULTIPLE TYPES OF EXTENSION DEVICES TO CONNECTION PORTS

BACKGROUNDS OF THE INVENTION

1. Field of the Invention

This invention relates to an information processing system for connecting a plurality of expansion devices as required, and particularly to an information processing system in which a desired expansion device is selected from a multiple types of expansion devices and connected to connection ports of a system controller.

2. Description of the Related Art

The information processing system has various types of expansion devices connected according to necessity based on a purpose of use. The expansion devices are connected to the connection ports provided on a system controller which provides general, centralized control of the information processing system.

This type of information processing system is conventionally provided with different connection ports on the system controller according to the types of expansion devices to be connected. In other words, the system controller is provided with a dedicated connection port for each expansion device and this port corresponds in a one-to-one relationship to each expansion device to be connected to the connection port.

On the other hand, users of the information processing system need to configure a desired system by combining required expansion devices according to the purpose of using the information processing system. Therefore, it has been demanded that connection ports of the information processing system have general versatility to some extent, so that the system can be configured with flexibility in response to the requirement of a user.

But, as described above, the conventional information processing system has a dedicated connection port to connect each expansion device. Unless the mutually corresponding connection port and expansion device are connected, the expansion device cannot be operated for diagnosis, configuration control and troubleshooting processing. Therefore, the connection port provided to conform with a particular expansion device cannot be used to connect another type of expansion device.

Accordingly, the conventional information processing system has a disadvantage that each user cannot connect a desired expansion device to the system controller to flexibly configure a desired system.

SUMMARY OF THE INVENTION

A first object of the invention is to provide an information processing system which has versatility without limiting the corresponding relationship between a connection port and an expansion device to a one-to-one relationship and can connect desired various types of expansion devices to a single connection port.

In addition to the above object, a second object of the invention is to provide an information processing system which can easily deal with a case that desired expansion devices are connected in combination to a system controller according to an operator's purpose of use and can be flexibly configured into a system desired by a user.

Besides, in addition to the above objects, a third object of the invention is to flexibly deal with a demand by a user for a system configuration, thereby reducing the necessity of making a dedicated design for each system and reducing a cost.

According to one aspect of the invention, an information processing system having expansion devices selectively connected to connection ports, comprising:

a system controller which has connection ports for connecting expansion devices and performs various information processing and general control; and control means for determining a type of said expansion device connected to said system controller and controlling operation of said expansion device according to the type of said expansion device.

In the preferred construction, the expansion device is one selected as desired from multiple types of expansion devices.

In another preferred construction, further comprises input means for entering into said control means the selected information which indicates the selected result of said expansion device to be connected to said connection port of said system controller, and installed device information storage means for storing installed device information indicating for said connection port the type of said expansion device connected to said system controller;

the control means comprises installed device information generating means for generating installed device information which shows the type of said expansion device connected to said system controller for said connection port in accordance with the input from said input means and for storing in said installed device information storage means; and device type control means for controlling the operation according to the type of said expansion device according to said installed device information stored in said installed device information storage means when said system controller instructs the operation of said expansion device.

Also, the input means includes display means for displaying said installed device information, and the installed information generating means displays said installed device information generated according to the input from said input means and said installed device information read from said installed device information storage means on said display means provided on said input means.

According to another aspect of the invention, an expansion device controller including a system controller having connection ports to connect expansion devices and the expansion devices connected to said system controller through said connection ports in order to control the connecting state of said expansion devices, comprising:

installed device information generating means for generating installed device information which shows the type of said expansion device connected to said system controller for said connection port, and device type control means for controlling the operation according to the type of said expansion device according to said installed device information when said system controller instructs the operation of said expansion device.

In the preferred construction, the invention further comprises input means for entering into said installed device information control means the selected information which indicates the selected result of said expansion device to be connected to said connection ports of said system controller, and installed device information storage means which store installed device information indicating for said connection port the type of said expansion device connected to said system controller;

the device type control means including means for controlling the operation according to the type of said expansion device according to said installed device information stored in said installed device information storage means when said system controller instructs the operation of said expansion device.

In another preferred construction, the input means include display means for displaying said installed device information, and the installed information generating means displays said installed device information generated according to the input from said input means and said installed device information read from said installed device information storage means on said display means provided on said input means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a diagram showing combinations of expansion devices to be installed in the system controller according to this embodiment.

DESCRIPTION OF THE PREFERRED EMBODIMENT

Figure 1:
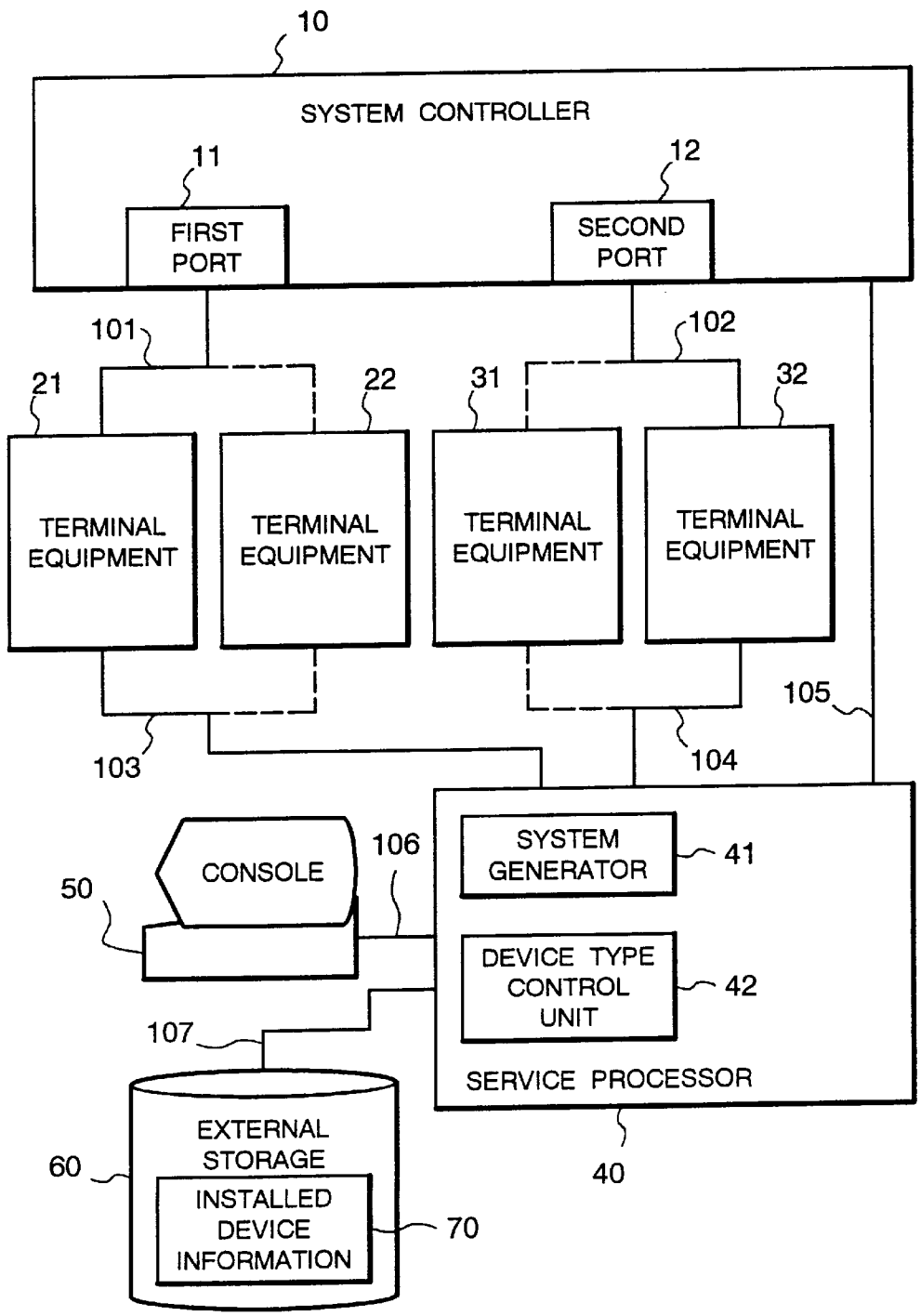
FIG. 1 is a block diagram showing the configuration of an information processing system according to one embodiment of the invention.

Preferred embodiments of the invention will be described in detail with reference to the accompanying drawings. FIG. 1 is a block diagram showing the configuration of an information processing system according to one embodiment of the invention.

It is seen that the information processing system of this embodiment includes a system controller 10, expansion devices 21, 22, 31, 32 connected to the system controller 10, a service processor 40 as control means for controlling the connection of the expansion devices 21, 22, 31, 32, a console 50, and an external storage 60. This drawing shows only the characteristic components of this embodiment and omits other components. And, to simplify the description of the embodiment, the connection of the above four expansion devices 21, 22, 31, 32 to the system controller 10 will be described. It is to be understood that the quantity of the expansion devices to be connected to the system controller 10 can be determined as desired according to the quantity of the connection ports.

The system controller 10 is used in a computer having a program-controlled CPU and performs various arithmetic computations and general control of the system. And, the system controller 10 has connection ports for the connection of the expansion devices 21, 22, 31, 32. Each connection port is provided to conform with the type of an expansion device to be connected. Besides, the system controller 10 has a service processor 40 connected through a signal line 105. In this embodiment, to make the description simple, the system controller 10 is assumed to have two types of connection ports; a first port 11 and a second port 12 only. In practical use, the system controller 10 can be provided with desired types of connection ports determined according to the purpose of use. In the following description, the first port 11 and the second port 12 will be referred to as the connection ports 11, 12 unless they are particularly distinguished.

The expansion devices 21, 22 correspond to the first port 11 of the system controller 10, and either of the expansion device 21 or the expansion device 22 is connected to the first port 11 through a signal line 101. The expansion devices 31, 32 correspond to the second port 12 of the system controller 10 and either of the expansion device 31 or the expansion device 32 is connected to the second port 12 through a signal line 102. And, the expansion devices 21, 22 are connected to the service processor 40 through a signal line 103, and the expansion devices 31, 32 through a signal line 104.

The service processor 40 is implemented by a program-controlled CPU and operated for diagnosis, configuration control and troubleshooting processing of the system controller 10 and the expansion devices 21, 22, 31, 32. The service processor 40 includes a system generator 41 for selecting the expansion devices 21, 22, 31, 32 to be connected to the connection ports 11, 12 of the system controller 10, and a device type control unit 42 for controlling so as to enable appropriate processing according to the type of the expansion device.

The system generator 41 is activated by the console 50 and outputs the selected screen of the expansion devices 21, 22, 31, 32 to be connected to the first port 11 and the second port 12 of the system controller 10 on the display of the console 50. When the operator selects the expansion devices 21, 22, 31, 32 to be connected, based on the entered selection information, installed device information 70 which indicates the expansion devices 21, 22, 31, 32 selected to be connected to the connection ports 11, 112 is prepared and written in the external storage 60.

When the service processor 40 performs diagnosis, configuration control and troubleshooting processing of the expansion device 21 or the expansion device 22 to be connected to the first port 11 of the system controller 10, and the expansion device 31 or the expansion device 32 to be connected to the second port 12, the device type control unit 42 refers to the installed device information 70 stored in the external storage 60 in order to determine which expansion devices are connected to the connection ports 11, 12. And, the device type control unit 42 controls to perform appropriate processing according to the connected expansion devices.

The console 50 is implemented by I/O devices such as a CRT display and a keyboard, and connected to the service processor 40 through a signal line 106, enabling the I/O operation of the service processor 40. Thus, the selection operation of the expansion device 21, 22, 31, 32 to be connected to the connection ports 11, 12 of the system controller 10 is performed.

The external storage 60 is connected to the service processor 40 through a signal line 107 and stores the installed device information 70 on the expansion devices 21, 22, 31, 32 connected to the system controller 10.

Figure 2:
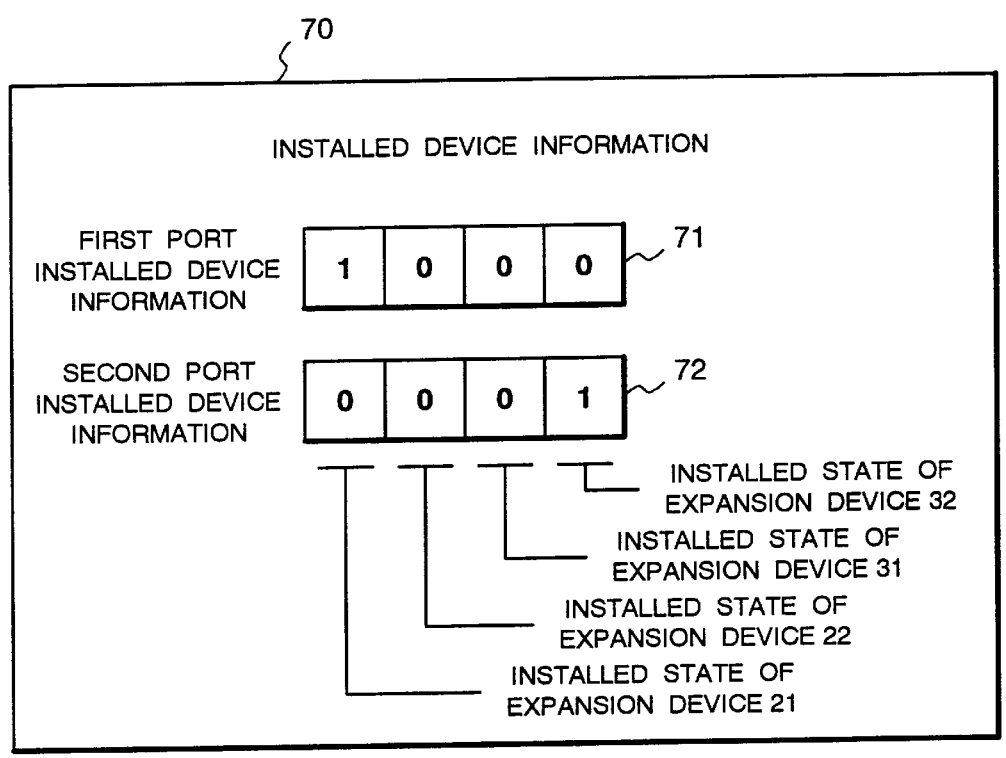
FIG. 2 is a diagram showing the configuration of installed device information according to this embodiment.

FIG. 2 shows the installed device information 70. It is seen that the installed device information 70 has first port installed device information 71 showing a state that an expansion device is connected to the first port 11 and second port installed device information 72 showing a state that an expansion device is connected to the second port. The installed device information 71, 72 for respective connection ports have information columns which indicate the installation or not of the expansion devices 21, 22, 31, 32; "1" indicates an installed expansion device for each port and "0" indicates a non-installed expansion device. It is seen that the expansion device 21 is installed in the first port 11, and the expansion device 32 in the second port 12.

The installed device information 70 is outputted to the console 50 by the system generator 41, and the selection screen of the expansion devices can be shown on the display of the console 50. The operator refers to the displayed screen showing the installed device information 70 to operate the input device of the console 50 to insert "1" in the information column corresponding to a desired expansion device, thereby selecting the expansion devices 21, 22, 31, 32 to be installed in the connection ports 11, 12. FIG. 3 shows combinations of the expansion devices which can be connected in this embodiment. By referring to the installed device information 70 by the device type control unit 42, it is possible to determine in what combination of cases 1 through 8 the expansion devices are installed.

In the illustrated case, the first port installed device information 71 and the second port installed device information 72 are provided with information columns for setting the connection for all the expansion devices 21, 22, 31, 32, but the first port 11 has only the expansion devices 21, 22 connected, and the second port 12 has only the expansion devices 31, 32 connected, so that only corresponding information columns may be provided.

Figure 4:
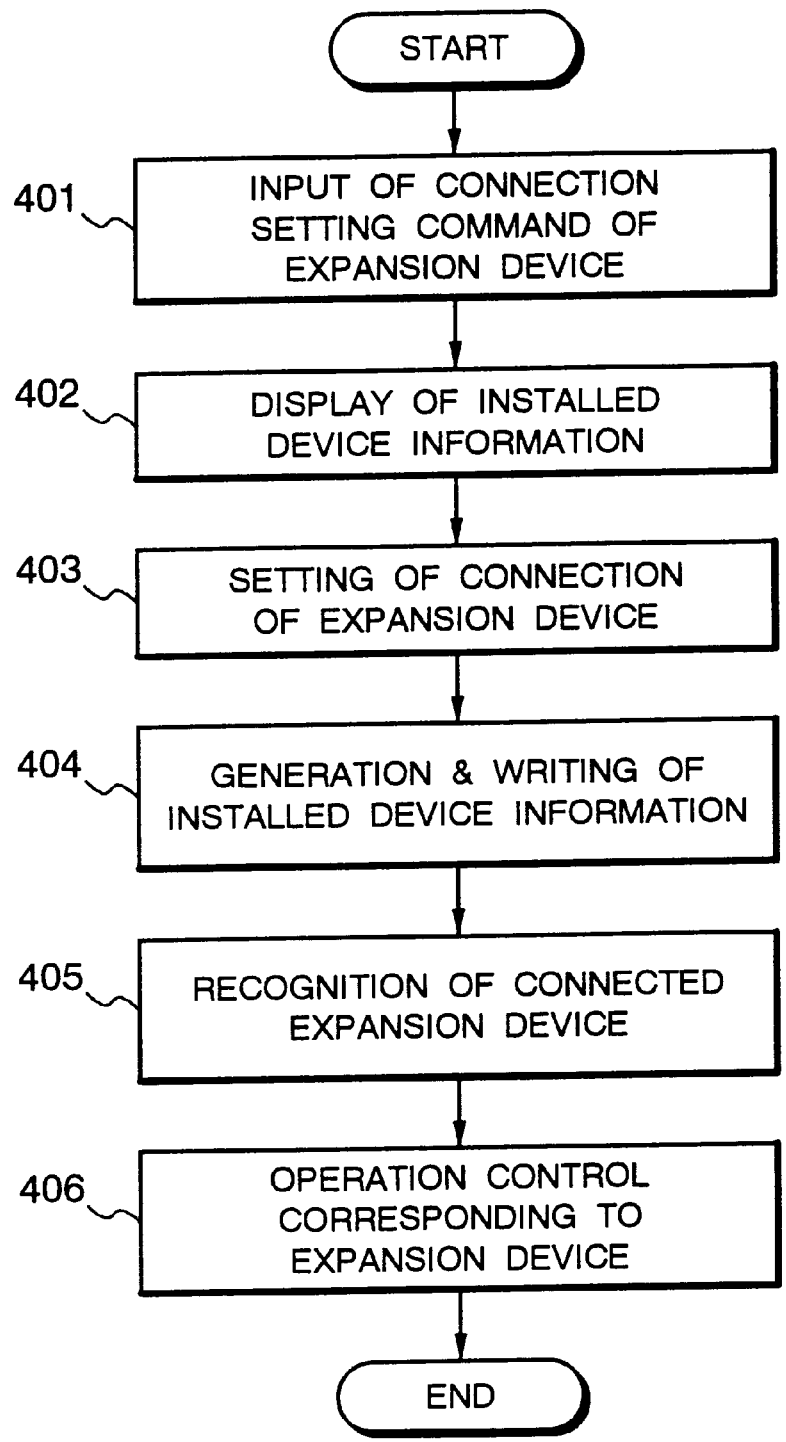
FIG. 4 is a flowchart showing a selection operation of the installed state of an expansion device according to this embodiment.

The setting operation for connection of the expansion devices for the information processing system of this embodiment configured as described above will be described with reference to the flowchart of FIG. 4.

As the initial state, the display of the console 50 generally displays a menu screen. When the operator enters a command from the input device of the console 50 to request the setting to connect the expansion devices (step 401), the system generator 41 of the service processor 40 reads the installed device information 70 indicating the installed state of the expansion devices at the moment from the external storage 60 and displays it on the display of the console 50 (step 402).

The operator enters "1" in the information column, which corresponds to the expansion device to be installed, of the installed device information 71, 72 for the connection ports 11, 12 to set the connection of the expansion devices 21, 22, 31, 32 in a desired combination to the connection ports 11, 12 (step 403).

The above operation can be performed interactively between the requirement shown on the display of the console 50 and the input to respond to this requirement by the operator from the input device.

Then, the system generator 41 of the service processor 40 writes the installed device information 70 set according to the input by the operator into the external storage 60 (step 404).

When the service processor 40 controls to perform diagnosis, configuration control and troubleshooting processing of the expansion devices 21, 22, 31, 32 connected to the connection ports 11, 12, the device type control unit 42 of the service processor 40 refers to the installed device information 70 stored in the external storage 60 to determine which expansion devices are connected to the connection ports 11, 12 (step 405), and controls to perform appropriate processing (step 406). In FIG. 2 for example, the expansion device 21 is installed in the first port 11 and the expansion device 32 in the second port 12, so that control is performed to allow processing according to the expansion devices 21, 32.

As described above, by the information processing system of the invention, the service processor determines a type of the expansion device connected to each connection port and controls to enable the diagnosis, configuration control and troubleshooting processing according to the expansion device, so that it has advantages of easily dealing with a case that particular expansion devices are combined as the operator desires for the purpose of use and connected to the system controller, enabling to flexibly configure a system desired by the user.

And, when a particular type of connection port or all connection ports have the expansion devices already connected, and another expansion device is to be connected additionally; there is an effect of making appropriate processing of the newly installed expansion device by previously connecting physically and rewriting the installed device information through the service processor as required.

Besides, in addition to the above objects, the third object of the invention is to flexibly deal with a demand by a user for a system configuration, thereby reducing the necessity of making a dedicated design for each system and lowering a cost.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A combination comprising:

a general purpose computer having a system controller which has connection ports for connecting one or more expansion devices to said computer; and a service processor, connected to said system controller via a signal line, said service processor making a type determination for each expansion device connected to said system controller, and causing said system controller to control operation of each one of said one or more expansion devices according to the type of said each expansion device upon making said type determination for said each expansion device;

an input for entering selected information into said service processor, said information indicating a selection of said one or more expansion devices to be connected to said connection ports of said system controller;

said service processor comprising:

an installed device information generator that generates installed device information corresponding to the type of each of said one or more expansion devices connected to said system controller via said connection ports in accordance with said selected information, and enables said service processor to generate said installed device information prior to initialization of said system controller; and a device type controller that causes said system controller to control operation of each one of said one or more expansion devices according to said installed device information generated by said installed device information generator.

2. The combination claimed in claim 1, wherein each one of said one or more expansion devices is selected as desired from among plural types of expansion devices.

3. The combination claimed in claim 1, further comprising:

installed device information storage means for storing installed device information indicating for each of said connection ports the type of a corresponding expansion device;

said service processor comprising:

device type control means for causing said system controller to control operation of said one or more expansion devices according to the type of each expansion device in accordance with said installed device information stored in said installed device information storage means.

4. The combination claimed in claim 1, further comprising:

input means for entering selected information into said service processor which indicates selection by a user of at least one of said one or more expansion devices to be connected to said connection port of said system controller, and installed device information storage means for storing installed device information indicating for each of said connection ports the type of a corresponding expansion device;

said service processor comprising:

installed device information generating means for generating installed device information which corresponds to the type of each of said one or more expansion devices connected to said system controller via one of said connection ports, in accordance with the information input via said input means, and for storing the generated installed device information in said installed device information storage means; and device type control means for causing said system controller to control operation of said one or more expansion devices according to the type of each expansion device according to said installed device information stored in said installed device information storage means.

5. The combination as claimed in claim 4, wherein:

said input means includes display means for displaying said installed device information, and said installed information generating means displays, via said display means, said installed device information generated according to the input from said input means and said installed device information read from said installed device information storage means.

6. A service processor for use with a computer for diagnosis, configuration control, or troubleshooting processing of a system controller of the computer, the system controller having connection ports to connect expansion devices, and the expansion devices being connected to said system controller through respective ones of the connection ports, the service processor comprising:

installed device information generating means for identifying the type of each of said expansion devices connected to said system controller through said connection ports, and generating installed device information which corresponds to the type of each of said expansion devices connected to said system controller, and enables said service processor to generate said installed device information prior to initialization of said system controller; and device type control means for causing the system controller to control operation of each one of said one or more expansion devices according to said installed device information generated by said installed device information generating means.

7. The service processor as claimed in claim 6, further comprising:

input means for entering selected information into said installed device information generating means which indicates the selection by a user of at least one of said one or more expansion devices to be connected to the connection ports of the system controller, wherein said installed device information generating means generates said installed device information according to the information input via said input means.

8. The service processor as claimed in claim 6, further comprising:

installed device information storage means for storing installed device information which indicates the type of each of the expansion devices connected to the connection ports, wherein said device type control means causes the system controller to control operation each one of said one or more expansion devices according to said installed device information stored in said installed device information storage.

9. The service processor as claimed in claim 6, further comprising:

input means for entering selected information into said installed device information generating means which indicates the selection by a user of at least one of said one or more expansion devices to be connected to the connection ports of the system controller; and installed device information storage means for storing installed device information indicating the type of each of the expansion devices connected to the connection ports;

wherein said device type control means causes the system controller to control operation each one of said one or more expansion devices according to said installed device information stored in said installed device information storage means.

10. The service processor as claimed in claim 9, wherein:

said input means includes a display means for displaying said installed device information, and said installed information generating means displays, via said display means, said installed device information generated according to the input from said input means and said installed device information read from said installed device information storage means.

11. The combination as claimed in claim 1, wherein said service processor is connected to said system controller when diagnosis, configuration control, or troubleshooting processing of the system controller is needed.

* * * * *